United States Patent [19]
Higuchi et al.

[11] Patent Number: 5,135,960
[45] Date of Patent: Aug. 4, 1992

[54] SPONGE-FORMING ORGANOSILOXANE COMPOSITION

[75] Inventors: Kazuo Higuchi; Akito Nakamura, both of Ichihara, Japan

[73] Assignee: Dow Corning Toray Silicone Company, Ltd., Tokyo, Japan

[21] Appl. No.: 782,694

[22] Filed: Oct. 25, 1991

[30] Foreign Application Priority Data

Oct. 30, 1990 [JP] Japan .................................. 2-293217
Apr. 30, 1991 [JP] Japan .................................. 3-126669

[51] Int. Cl.$^5$ ........................... C08J 9/00; C08J 9/10
[52] U.S. Cl. ........................................ 521/76; 521/82; 521/91; 521/95; 521/134; 521/154; 528/15; 528/31; 528/32
[58] Field of Search ...................... 521/82, 76, 91, 95, 521/134, 154; 528/15, 31, 32

[56] References Cited

U.S. PATENT DOCUMENTS

| | | |
|---|---|---|
| 4,766,176 | 8/1988 | Lee et al. .............................. 528/32 |
| 4,874,667 | 10/1989 | Lee et al. .............................. 528/901 |
| 5,015,691 | 5/1991 | Lewis et al. ........................... 528/32 |
| 5,064,924 | 11/1991 | Shimizu et al. ....................... 528/15 |
| 5,066,699 | 11/1991 | Lee et al. .............................. 528/15 |

Primary Examiner—Morton Foelak
Attorney, Agent, or Firm—Robert Spector

[57] ABSTRACT

The disadvantages associated with using a platinum-catalyzed hydrosilylation reaction to prepare sponge products from curable organosiloxane compositions can be overcome by microencapsulating the platinum-containing catalyst in a thermoplastic organic or organosilicone polymer.

3 Claims, No Drawings

SPONGE-FORMING ORGANOSILOXANE COMPOSITION

BACKGROUND OF THE INVENTION

1. Field of the Invention

This invention relates to compositions suitable for preparing silicone rubber sponge. More particularly this invention relates to organosiloxane compositions that can be cured by heating to produce a silicone rubber sponge having a uniform, microfine cell structure.

2. Background Information

Silicone rubber sponge is prepared by the addition of an organic blowing agent to a curable organosiloxane composition containing a high consistency organopolysiloxane and a curing agent for the organopolysiloxane. The method used to cure the composition is matched to the decomposition rate of the blowing agent, which is equivalent to the foaming rate for the composition.

Examples of available curing methods for preparing silicone rubber sponge from high consistency organosiloxane compositions include use of organic peroxides and curing by a hydrosilylation reaction employing an organohydrogenpolysiloxane as the curing agent and a platinum compound as the curing catalyst.

Organic peroxides typically require long heating periods to achieve curing, making it very difficult to obtain silicone rubber sponge having uniform and microfine cells. In addition, satisfactory curing cannot be obtained using organic peroxides when the curable composition contains electrically conductive carbon black, which essentially precludes the manufacture of electrically conductive silicone rubber sponge.

A disadvantage of curing organosiloxane compositions using platinum-containing catalysts is the short working time resulting from the high activity of these catalysts. In particular, it is difficult to maintain a balance between the cure rate and the foaming rate of the curable composition. Manufacture of silicone rubber sponge having a uniform and microfine cellular structure by this method is therefore problematic.

The present inventors carried out extensive investigations in order to solve the aforementioned problems and developed the present invention as a result.

One objective of the present invention to provide high consistency organosiloxane compositions capable of being thermally cured to form a silicone rubber sponge exhibiting a microfine and uniform cell structure.

SUMMARY OF THE INVENTION

The present invention discovered that the disadvantages associated with using a platinum-catalyzed hydrosilylation reaction to prepare silicone rubber sponge products can be overcome by microencapsulating the platinum-containing catalyst in a thermoplastic organic or organosilicone polymer.

DETAILED DESCRIPTION OF THE INVENTION

This invention provides a curable organosiloxane sponge-forming composition comprising (A) 100 weight parts of a high consistency organopolysiloxane gum containing at least 2 silicon-bonded alkenyl radicals in each molecule and represented by the average unit formula $$R_a SiO_{(4-a)/2}$$

wherein R represents a substituted or unsubstituted monovalent hydrocarbon radical and a is a number with a value of 1.8 to 2.3, (B) 0.1 to 10 weight parts of an organohydrogenpolysiloxane containing at least 2 silicon-bonded hydrogen atoms in each molecule, (C) 5 to 150 weight parts of an inorganic filler, (D) 0.5 to 20 weight parts of an organic blowing agent, and (E) a quantity sufficient to catalyze curing of said composition of a platinum-containing hydrosilylation catalyst that is microencapsulated within microparticles of a thermoplastic polymer selected from the group consisting of organic polymers and organosilicone polymers, where the platinum content of said catalyst constitutes 0.01 weight percent of said microparticles, the softening point of said thermoplastic polymer is from 50 to 250 degrees Centigrade and the diameter of said microparticles is from 0.01 to 10 micrometers.

The ingredients of the present curable organosiloxane compositions will now be described in detail.

The High Consistency Organopolysiloxane (Ingredient A)

The high consistency organopolysiloxane gum comprising the ingredient A of the presnet compositions is the principal or base ingredient and it must contain at least 2 silicon-bonded alkenyl radicals in each molecule. The group represented by R in the aforementioned average unit formula for this organopolysiloxane is a substituted or unsubstituted monovalent hydrocarbon radical exemplified by but not limited to alkyl radicals such as methyl, ethyl, propyl, butyl, hexyl, and octyl; cycloalkyl radicals such as cyclohexyl; alkenyl radicals such as vinyl, allyl, and hexenyl; aromatic hydrocarbon radicals such as phenyl, tolyl and benzyl; and substituted hydrocarbon radicals such as 3,3,3-trifluoropropyl. Any substituents are preferably halogen.

The subscript a in the formula represents a number with a value of 1.8 to 2.3.

While the molecular structure of ingredient A is preferably straight chain, small concentrations of branched siloxane structures can also be present. The degree of polymerization of ingredient A is not specifically restricted, so long as it is within the range understood by those skilled in the art as characteristic of high consistency or "gum" type organopolysiloxanes. Organopolysiloxanes with viscosities of at least $10^7$ centistokes at 25 degrees Centigrade and average molecular weights of at least $25 \times 10^4$ are preferred.

The Organohydrogenpolysiloxane (Ingredient B)

The organohydrogenpolysiloxane, referred to as ingredient B of the present compositions, is a crosslinker for the organopolysiloxane (ingredient A). For the present compositions to form or develop a network structure during curing ingredient B should contain at least 2 silicon-bonded hydrogen atoms in each molecule and the sum of the number of alkenyl radicals in each molecule of ingredient A and the number of silicon-bonded hydrogen atoms in each molecule of ingredient B should exceed 4.

Excluding the silicon-bonded hydrogen atoms, the silicon-bonded organic groups in ingredient B are selected from the same group of substituted and unsubstituted monovalent hydrocarbon radicals represented by R in the average formula for the repeating units of ingredient A, with the proviso that alkenyl radicals are excluded from ingredient B.

Each molecule of organohydrogenpolysiloxane may contain only a single species of organic group, or two or more species may be simultaneously present. The molecular structure of this ingredient can be straight chain, network, or three dimensional, and the ingredient can be a homopolymer or a copolymer. Mixtures of two or more types of polymers can also be used.

The degree of polymerization of ingredient B generally corresponds to a viscosity at 25 degrees Centigrade of from 0.5 to 50,000 centipoise (0.0005 to 50 Pa.s), preferably from 1 to 10,000 centipoise (0.001 to 10 Pa.s).

The concentration of ingredient B in the present compositions is preferably equivalent to a molar ratio of silicon-bonded hydrogen atoms to vinyl or other alkenyl radicals in ingredient A of from 0.5 to 10 and preferably in the range of from 1 to 10.

The Inorganic Filler (Ingredient C)

Any of the inorganic fillers conventionally used in curable silicone elastomer compositions can be used in the present compositions, without any particular restrictions. Preferred fillers include but are not limited to fumed silica, precipitated silica, silicas which have been hydrophobicized by treatment with organosilane or organosiloxane, fused silica, quartz powder, diatomaceous earth, calcium carbonate, alumina, and carbon black. The concentration of ingredient C in the present compositions should be from about 5 to 150 weight parts, preferably from 20 to 80 weight parts per 100 weight parts of ingredient A.

The Organic Blowing Agent (Ingredient D)

The organic blowing agent in the present compositions can be any of those organic blowing agents conventionally used in foamable organosiloxane elastomers, with no additional restrictions. Suitable organic blowing agents include but are not limited to azo-bis-isobutyronitrile, azodicarbonamide, dinitrosopentamethylenetetramine, 4,4'-oxy-bis-benzene sulfonylhydrazide, and p-toluenesulfonylhydrazide.

The Microencapsulated Catalyst (Ingredient E)

The characterizing feature of the present compositions is the presence of a microencapsulated platinum-containing hydrosilylation catalyst in the form of spherical microparticles of a thermoplastic polymer. This ingredient is responsible for the uniformly small cell size and desirable properties exhibited by sponge products prepared using these compositions.

The platinum-containing catalyst is microencapsulated within a thermoplastic organic or organosilicone polymer having a softening point in the range of 50 to 250 degrees Centigrade. When the softening point of the thermoplastic polymer is less than 50 degrees Centigrade, the storage stability of a curable organosiloxane composition containing this ingredient will be very much reduced. When the softening point of the polymer is above 250 degrees Centrigrade, the temperature at which the catalytic activity is developed becomes so high that this ingredient's catalytic function will essentially not be apparent.

The softening point of the encapsulating thermoplastic polymer is preferably from 50 to 200 degrees Centigrade, most preferably from 70 to 150 degrees Centigrade.

Within each microparticle the catalyst can be present as a core within a shell of the thermoplastic polymer, or the catalyt can be dispersed within a matrix of the thermoplastic polymer.

The thermoplastic polymer used to microencapsulate the platinum-containing catalyst can be any thermoplastic organic or organosilicone polymer that is essentially impermeable to the catalyst at least during storage and insoluble in the organopolysiloxane (ingredient A of the present compositions).

Thermoplastic organic polymers suitable for encapsulating the platinum-containing hydrosilylation catalyst include but are not limited to (1) addition type polymers, including polyolefins such as polyethylene, polypropylene and polystyrene, and copolymers of styrene with butadiene and/or acrylonitrile; polymers of ethylenically unsaturated carboxylic acids and esters thereof, including esters of acrylic and methacrylic acids; and polymers derived from other ethylenically unsaturated compounds, such as polyvinyl alcohol and esters thereof; and (2) condensation type polymers such as polyamides, and polyesters such as alkyl esters of terephthalic acid. Examples of suitable organosilicone polymers included but are not limited to elastomeric and resinous polyorganosiloxanes and polysilane resins.

The microparticles that constitute ingredient E contain at least 0.01 weight percent of platinum in the form of a platinum-containing hydrosilylation catalyst. The catalyst can be either platinum metal or a platinum compound which catalytically accelerates the hydrosilylation reaction, or a composition containing such a catalyst.

Examples of suitable platinum-containing hydrosilylation reaction catalysts include but are not limited to finely divided platinum, chloroplatinic acid, alcohol-modified chloroplatinic acid, platinum/diketone complexes, chloroplatinic acid/olefin complexes, chloroplatinic acid/alkenylsiloxane complexes, and any of the preceding catalysts on a carrier such as alumina, silica, or carbon black. Among these, chloroplatinic acid/alkenylsiloxane complexes are preferred as the hydrosilylation-reaction catalyst for their high catalytic activity, and the platinum/alkenylsiloxane complex described in Japanese Patent Publication Number 42-22924 [22,924/67] is particularly preferred.

The concentration of microencapsulated catalyst (ingredient E) is generally equivalent to from 0.001 to 100 weight parts, based on platinum metal, per million weight parts of the organopolysiloxane (ingredient A). This concentration is preferably from 0.01 to 10 weight parts per million parts of ingredient A.

The average particle size of the microencapsulated catalyst should be from 0.01 to 10 micrometers, and preferably from 0.1 to 10 micrometers. When the average particle size is less than 0.01 micrometers, the yield of catalyst is drastically reduced. When the average particle size exceeds 100 micrometers the stability of a dispersion of the microparticles in ingredient A is impaired.

Preferred embodiments of the microparticles are spherical in contour.

The sponge-forming organosiloxane compositions of the present invention in the most limited embodiment comprise ingredients (A) through (E). In addition to these five required ingredients the following ingredients may be added as necessary or desired to modify the final product or the method used to prepare it: reaction inhibitors such as benzotriazoles, acetylenic compounds, and hydroperoxy compounds; auxiliary curing agents such as organoperoxides; and conventional additives for silicone rubbers such as pigments and heat stabilizers. These conventional additives are exemplified by but not limited to carbon black, iron oxide, titanium oxide, zinc oxide, magnesium oxide, rare earth oxides and hydroxides, and the salts of aliphatic and fatty acids, e.g., of stearic acid.

The present compositions are conveniently prepared by blending ingredients (A) through (E) with one number to homogeneity. While the sequence in which these ingredients are added is not specifically restricted, a preferred method consists of mixing and homogeneously dispersing components (D) and (E) into a small quantity of component (A) and then adding this to a mixture of components (A), (B), and (C). In addition, in order to prevent thermal destruction of the microparticles of encapsulated catalyst, mixing is preferably conducted below the softening point of the thermoplastic polymer portion of ingredient (E).

EXAMPLES

The present invention is explained in greater detail by means of the following illustrative and reference examples, in which parts and percentages are by weight unless otherwise specified and viscosities are measured at 25° C.

REFERENCE EXAMPLE 1

Preparation of a Platinum/Vinylsiloxane Complex Composition

6 Grams of an aqueous chloroplatinic acid solution containing 33 percent of platinum and 16 g of 1,3-divinyltetramethyldisiloxane were dissolved in 35 g of isopropyl alcohol. 10 Grams sodium bicarbonate were added to the resulting solution, followed by heating for 30 minutes at 70 to 80 degrees Centigrade with stirring of the resultant suspension. The isopropyl alcohol and water were then removed by evaporation at 50 mm Hg/45° C. and the solids were filtered off to yield a solution of a vinylsiloxane-coordinated platinum complex catalyst containing 9.8 weight percent platinum in 1,3-divinyltetramethyldisiloxane.

REFERENCE EXAMPLE 2

Preparation of Thermoplastic Silicone Resin

A solution prepared by blending 332 g phenyltrichlorosilane, 53 g dimethyldichlorosilane, and 110 g diphenyldichlorosilane diluted with 150 g toluene was hydrolyzed by dripping it into a solution containing 430 g toluene, 142 g methyl ethyl ketone, and 114 g water. The resultant mixture was then washed with water to remove the hydrogen chloride, and the organic layer was separated and subsequently heated to remove the methyl ethyl ketone. 0.2 Grams potassium hydroxide was added to the resultant solution, followed by heating and distillation of the evolved water, then by neutralization with acetic acid, and finally repeated washing with water. The solvent was subsequently removed by evaporation to yield a solid thermoplastic silicone resin with a glass transition temperature of 65° C. and a softening point of 85° C.

REFERENCE EXAMPLE 3

Preparation of a Spherical Microencapsulated Catalyst

900 Grams of the thermoplastic silicone resin prepared in Reference Example 2, 500 g toluene, and 4,600 g dichloromethane were introduced into a stirrer-equipped glass reactor and mixed to homogeneity. 44.4 Grams of the platinum/vinylsiloxane complex composition prepared as described in Reference Example 1 was then added with stirring to form a homogeneous solution of the thermoplastic silicone resin and platinum/vinylsiloxane complex. This solution was continuously sprayed into a spray dryer tank through a atomizer nozzle while a stream of heated nitrogen was circulated through the dryer chamber, hot nitrogen current. The temperature of the nitrogen was 95° C. at the spray dryer inlet, 45° C. at the spray dryer outlet, and the nitrogen flow rate was 1.3 m$^3$/minute. After operating the spray dryer for one hour, 450 g of microencapsulated catalyst had been collected using a bag filter.

The microencapsulated catalyst had an average particle size of 1.1 micrometers and contained 0.5 weight % of the hydrosilylation catalyst described in reference example 1. The particles had a spherical morphology when observed under a scanning electron microscope, and contained approximately 0.4 weight percent catalyst, expressed as platinum metal.

REFERENCE EXAMPLE 4

Preparation of a Catalsyt Microencapsualted in a Methyl Methacrylate/Butyl Methacrylate Copolymer 450 g. of a platinum-containing catalyst microencapsualted in a methyl methacrylate/butyl methacrylate copolymer was prepared as described in Reference Example 3, with the exception that a methyl methacrylate/butyl methacrylate copolymer exhibiting a softening point of 115° C. and a glass transition temperature of 80° C. was used in place of the thermoplastic silicone resin.

The average particle size of the microencapsulated catalyst was 2.5 micrometers with 2.0 weight percent of the particles larger than 10 micrometers, and the particles contained 0.39 weight percent of catalyst, expressed as platinum metal. When observed under a scanning electron microscope the particles had a spherical morphology.

EXAMPLE 1

The following ingredients were first blended to homogeneity under ambient conditions followed by mixing for 1 hour at 150 degrees Centigrade to form mixture I: 100 parts of a trimethylsiloxy-terminated organopolysiloxane gum exhibiting a degree of polymerization of 3,000 and containing 99.85 mole % dimethylsiloxane units and 0.15 mole % methylvinylsiloxane units, 40 parts fumed silica, and 10 parts of a silanol-terminated dimethylpolysiloxane with a viscosity of 80 centipoise (0.08 Pa.s). After mixture (I) had cooled, the following ingredients were added with mixing in amounts based on 100 parts of mixture I to form mixture II: 0.6 parts of the spherical microencapsulated catalyst prepared as described in Reference Example 3, 0.03 parts 1-ethynyl-1-cyclohexanol, and 1.0 part of a trimethylsiloxy-terminated dimethylsiloxane-methylhydrogensiloxane copolymer exhibiting a viscosity of 5 centipoise (0.005 Pa.s) and containing 0.8 weight percent of silicon-bonded hydrogen atoms.

A silicone rubber sponge composition was obtained by blending mixture II to homogeneity with 2.0 parts of an organic blowing agent with a decomposition temperature of 122° C. and consisting essentially of a mixture of azodicarbonamide and dinitrosopentamethylenetetramine. The blowing agent is available as Vinihole AK #2 from Eiwa Kasei Kogyo Kabushiki Kaisha. This composition was heated in an oven at 200 degrees Centigrade to form a spongy cured product. The cured product was cut open and the cut surface examined using an optical microscope. The cells present in the cured product had diameters within the range of 0.05 to 0.3 mm.

The expansion ratio for this sponge was 2.6, and its hardness was 10 to 13, measured using the Japan Industrial Standards A scale.

In addition, in order to evaluate the working time and storage stability of the curable sponge-forming composition prepared as described in the first part of this example, the composition was allowed to stand for 24 hours at room temperature and then cured and examined as described in the preceding section of this example. The cells in the spongy cured product thus obtained had diameters in the range of 0.05 to 0.3 mm.

COMPARISON EXAMPLE 1

As a comparison with sponge prepared using the present compositions, an organosiloxane sponge-forming composition was prepared as described in the preceding example 1, replacing spherical microencapsulated catalyst as prepared as described in Reference Example 3 with the unencapsulated platinum/vinylsiloxane complex described in Reference Example 1. The platinum concentration of the unencapsulated catalyst was equal to the total platinum content of the encapsulated catalyst present in the composition described in Example 1. The comparative composition was cured as described in Example 1 to yield a spongy cured product.

The cured product was cut open and its cut surface examined as described in Example 1. The size of the cells were in the range from 0.4 to 1.2 mm.

When the curable composition was stored at room temperature for 24 hours and then curd an evaluated as described in Example 1, the cells present in the cured product were irregular spheres of unequal size. A portion of the cured product did not contain any cells.

EXAMPLE 2

An organosiloxane spone-forming composition was prepared as described in Example 1 in the preceding section of this specification, with the exception that the thermoplastic silicone resin was replaced with the methyl methacrylate/butyl methacrylate copolymer described in reference Example 4.

The composition was cured as described in Example 1, and the cells present in the sponge were examined using the procedure described in this example. The diameter of the cells were in the range from 0.05 to 0.5 mm.

The expansion ratio for the sponge was 2.8 and the hardness from 8 to 10 on the Japanese Industrial Standards A scale.

When the curable composition was stored for 24 hours under ambient conditions prior to being cured, the cell sizes in the cured sponge ranged from 0.05 to 0.5 mm.

EXAMPLE 3

The following ingredients were first mixed to homogeneity under ambient conditions followed by mixing for 1 hour at 150 degrees Centigrade: 100 parts of a trimethylsiloxy-terminated organopolysiloxane gum exhibiting a degree of polymerization of 3,000 and consisting essentially of 99.85 mole % dimethylsiloxane units and 0.15 mole % methylvinylsiloxane units; 40 parts fumed silica available as Aerosil ® 200 from Nippon Aerosil Kabushiki Kaisha, and 10 parts of a silanol-terminated dimethylpolysiloxane with a viscosity of 80 centipoise.

After the mixture (mixture III) had cooled, the following amounts of ingredients were added with mixing, based on 100 weight parts of mixture II: 100 parts Ketjenblack ® was added with mixing to homogeneity followed by 0.6 parts of the spherical microencapsulated catalyst as prepared as described in Reference Example 3, 0.02 parts 1-ethynyl-1-cyclohexanol, and 1.5 parts of a trimethylsiloxy-terminated dimethylsiloxanemethylhydrogensiloxane copolymer exhibiting a viscosity of 5 centipoise (0.005 Pa.s) and a silicon-bonded hydrogen atom content of 0.8 weight percent.

A sponge-forming organosiloxane composition of this invention was obtained by the addition to the resultant blend with mixing to homogeneity of 2.0 parts of an organic blowing agent consisting essentially of a mixture of azodicarbonamide and dinitrosopentamethylenetetramine. This mixture exhibits a decomposition temperature of 122° C. and is available as Vinihole AK #2 from Eiwa Kasei Kogyo Kabushiki Kaisha.

The curable composition was converted to a cured sponge by placing it into an oven at 200° C. This cured sponge was cut open and the cut surface was microscopically inspected. The cells present in the cured product had diameters within the range of 0.05 to 0.2 mm.

The expansion ratio for this sponge was 1.9, and its hardness was 17 to 18, measured using the Japanese Industrial Standards A scale.

EXAMPLE 4

An organosiloxane sponge-forming composition of this invention was prepared as described in Example 1, but replacing the blowing agent of Example 1 with azodicarbonamide exhibiting a decomposition temperature of 160° C. and available as Vinihole DW #6 from Eiwa Kasei Kogyo Kabushiki Kaisha. A cured sponge was prepared from the composition and examined as described in Example 1. The cells present in the cured sponge had diameters within the range of 0.08 to 0.5 mm.

That which is claimed is:

1. A curable organosiloxane sponge-forming composition comprising
   (A) 100 weight parts of a high consistency organopolysiloxane gum containing at least 2 silicon-bonded alkenyl radicals in each molecule and represented by the average unit formula $R_a SiO_{(4-a)/2}$ wherein R represents a substituted or unsubstituted monovalent hydrocarbon radical and a is a number with a value of 1.8 to 2.3, (B) 0.1 to 10 weight parts of an organohydrogenpolysiloxane containing at least 2 silicon-bonded hydrogen atoms in each molecule, (C) 5 to 150 weight parts of an inorganic filler, (D) 0.5 to 20 weight parts of an organic blowing agent, and (E) a quantity sufficient to catalyze curing of said composition of a platinum-containing hydrosilylation catalyst that is microencapsulated within spherical microparticles of a thermoplastic polymer selected from the group consisting of organic polymers and organosilicone polymers, where the platinum content of said catalyst constitutes 0.01 weight percent of said microparticles, the softening point of said thermoplastic polymer is from 50 to 250 degrees Centigrade and the diameter of said microparticles is from 0.01 to 10 micrometers.

2. A composition according to claim 1 where
said thermoplastic polymer is selected from the group consisting of polyolefins, polymers of ethylenically unsaturated carboxylic acids and esters thereof, polyamides, polyesters, polyvinyl alcohol, cellulose esters and organosilicone polymers, the concentration of said microparticles is equivalent to from 0.001 to 100 parts of platinum per million parts of said organopolysiloxane, the softening point of said thermoplastic polymer is from 70° to 150° C., the R radical in the average unit formula of said organopolysiloxane is selected from at least one member of the group consisting of alkyl, alkenyl and aryl radicals, with the proviso that said organopolysiloxane contains at least two alkenyl radicals per molecule, the viscosity of said organopolysiloxane is at least $10^7$ centipoise at 25° C., the viscosity of said organohydrogenpolysiloxane is from 0.5 to 50,000 centipoise at 25° C., the molar ratio of silicon-bonded hydrogen atoms to alkenyl radicals in said composition is from 0.5 to 10, said filler is silica, and said blowing agent is selected from the group consisting of azo-bis-isobutyronitrile, azodicarbonamide, dinitrosopentamethylenetetramine, 4,4'-oxy-bis-benzenesufonylhydyrazide, and p-toluenesulfonylhydrazide.

3. A composition according to claim 2 where the softening point of said thermoplastic polymer is from 70° to 150° C., the platinum-containing hydrosilylation catalyst is a chloroplatinic acid/alkenylsiloxane complex and the concentration of said microencapsulated hydrosilylation catalyst is equivalent to from 0.01 to 10 parts per million parts of said organopolysiloxane.

* * * * *